Oct. 30, 1934. M. W. FEINBERG ET AL Re. 19,353
WHEEL
Original Filed Feb. 11, 1933 2 Sheets-Sheet 1
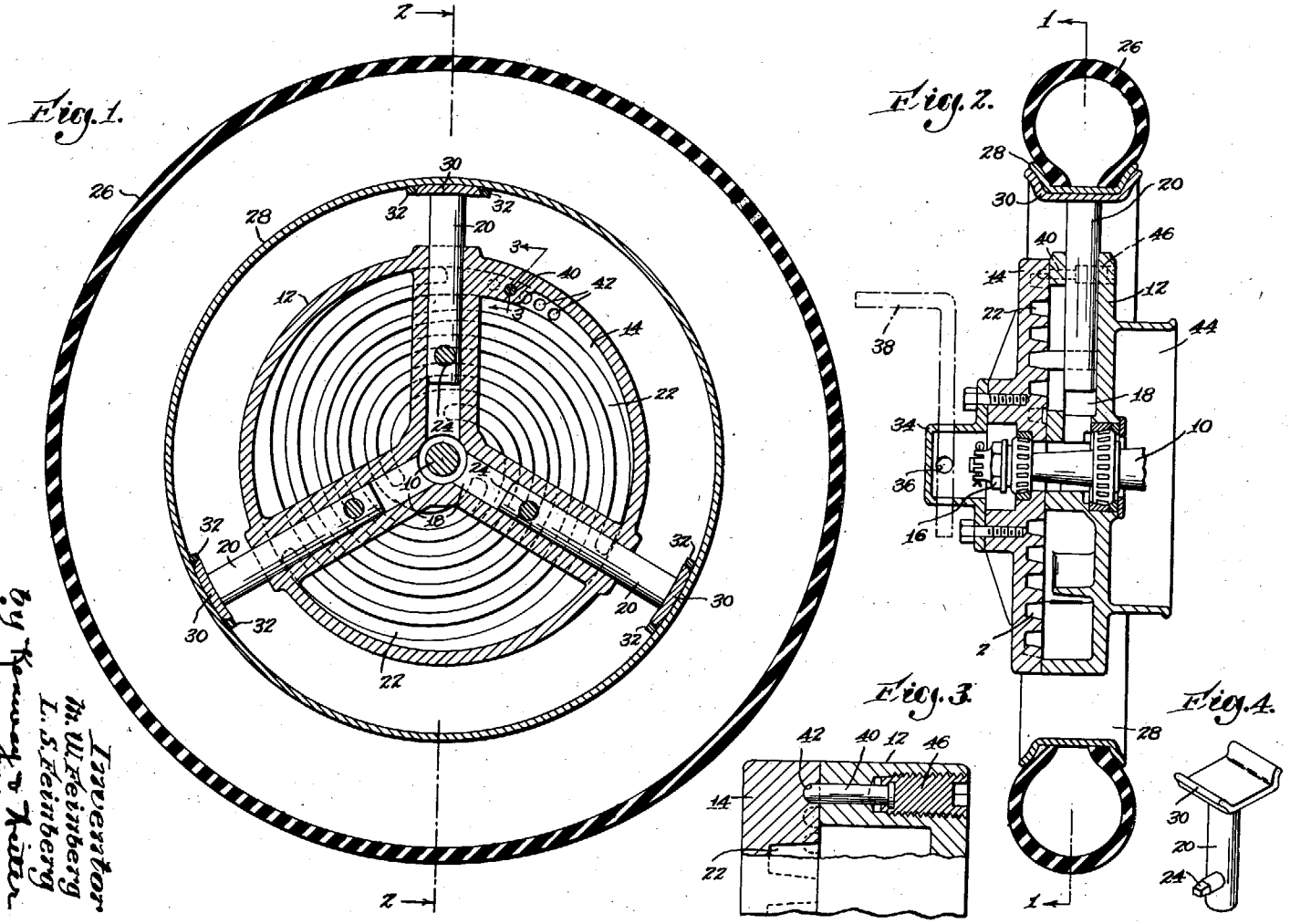
Inventor
M. W. Feinberg
L. S. Feinberg
by Kenway & Hiller
Attorney Oct. 30, 1934. M. W. FEINBERG ET AL Re. 19,353

WHEEL

Original Filed Feb. 11 1933 2 Sheets-Sheet 2

Inventors
M. W. Feinberg
L. S. Feinberg
by Kenway & Hitter
Attorneys

Reissued Oct. 30, 1934

Re. 19,353

UNITED STATES PATENT OFFICE 19,353

WHEEL

Marcus W. Feinberg, Chelsea, and Lester S. Feinberg, Brighton, Mass.

Original No. 1,946,787, dated February 13, 1934, Serial No. 656,300, February 11, 1933. Application for reissue April 27, 1934, Serial No. 722,787

10 Claims. (Cl. 301—12)

This invention relates to expansible wheels or the like for engaging and holding annular members such as the rims or tires of vehicle wheels. The removing and remounting of such members on wheels or like holding devices in present use require the expenditure of a considerable amount of time and labor and are, therefore, uneconomical in practice. The primary object of our invention is to produce a new and improved wheel for removably supporting annular members and embodies means for supporting the members more uniformly and permitting removal and change thereof with greater efficiency and ease than has been heretofore possible.

In one of its applications, our invention relates to vehicle wheels and we have herein more particularly described this application of the invention by way of example. Such a wheel comprising our invention may embody a hub, radially-movable spokes carried thereby and means for simultaneously and uniformly moving the spokes outwardly to engage and hold the rim or tire, or inwardly to release the rim or tire and permit changing thereof. In one form of the invention, the tire is mounted on a rim and the tire and rim are applied to the wheel as a unit, and in another form the rim is constructed in sections, which sections are carried by the spokes of the wheel and the tire alone is applied directly to the wheel without being previously mounted on a rim. In either case, the spokes are carried by the hub, which also embodies means for simultaneously adjusting the spokes radially by a relatively simple and quick operation.

The preferred construction of our improved wheel embodies an inner disk-like hub member carrying a plurality of spoke-forming plungers radially slidable therein and an outer hub member having connected therewith a plurality of cam or spirally-extending surfaces cooperating with the plungers to force them outwardly into position for holding the tire or other annular member, merely by rotating the outer member relative to the inner member, it being understood that the tire may be removed by rotating the outer member in the opposite direction. In one form of the invention, the plungers carry shoes on their outer ends for engaging and supporting the rim or other annular member. A lock or latch may also be provided for preventing relative rotation of the members when they are in the rim-holding position. Thus, to remove a tire and rim from the wheel, it is only necessary to release the latch and rotate the outer hub member, thus moving the rim-holding shoes inwardly. A substitute tire and rim may then be placed over the shoes and clamped into place merely by rotating the outer hub member in the opposite direction.

In another form of the invention, the rim is constructed in sections, which sections are respectively carried by the radially-movable and spoke-forming plungers. When the plungers are in their inward position, the tire may be conveniently placed thereover and then, merely by rotating the outer hub member, the rim sections are brought firmly into supporting contact with the tire. The tire may likewise be removed merely by rotating the outer hub member in the opposite direction.

It will thus be seen that we have produced an improved expansible wheel adapted to receive and hold annular members of varying diameters and which entirely eliminates the tedious operations of removing clamps and the like when it is required to remove and change the annular member. It will furthermore be noted that our invention is relatively simple, inexpensive and embodies few parts, which may be constructed and assembled with economy of cost and time.

The above and other features of the invention will be best understood and appreciated from the following description of our invention as embodied in an automobile wheel, selected for purposes of illustration and shown in the accompanying drawings, in which Fig. 1 is a transverse sectional view through an automobile wheel embodying our invention, taken on line 1—1 of Fig. 2;

Fig. 2 is a longitudinal section thereof taken on line 2—2 of Fig. 1;

Fig. 3 is a fragmentary detail section taken on line 3—3 of Fig. 1;

Fig. 4 is a perspective view of a spoke-forming plunger;

Figure 7:
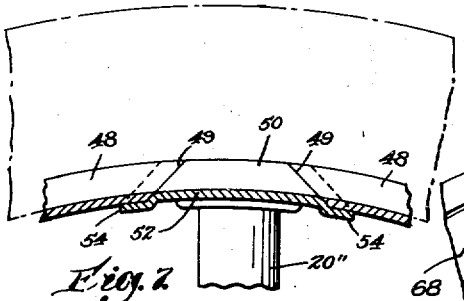
Fig. 7 is an enlarged fragmentary view showing a detail thereof.

Referring first to Figs. 1–4 of the drawings, the wheel mounted on the axle 10 comprises an inner disk-like hub member 12 and an outer disk-like hub member 14 held in face to face contact or relation on the axle by means including a nut 16. The two members 12 and 14 have annular hub bearing surfaces cooperating respectively with the two anti-friction bearings on the axle. The member 12 is formed with a plurality of radially-extending channels 18, within each of which is slidably mounted a spoke-forming plunger 20. Three such channels and plungers are illustrated in the drawings for the sake of simplicity, it being understood that any desired number may be employed. The inner face of the outer member 14 is spirally grooved at 22, three separate spirals being indicated, and laterally-projecting lugs 24 on the plungers project outwardly of the channels 18 through slots in the member 12 to engage within the grooves 22. It will be obvious that rotation of the member 14 in one direction relative to the member 12 will move the plungers outwardly and rotation thereof in the opposite direction will move the plungers inwardly.

A tire 26 is illustrated as mounted on a metallic rim 28, which rim is engaged by shoes 30 carried on the outer ends of the plungers 20, the shoes conforming in shape to the rim. Lugs 32 on the rim, at opposite sides of the shoes, prevent rotation of the rim relative to the wheel. A hub cap 34 is mounted on the member 14 over the nut 16 and holes 36 therethrough accommodate a crank handle 38. When the shoes are in the rim-holding position illustrated, the members 12 and 14 may be prevented from relative rotation by any convenient means, such as a latch pin 40 carried by the member 12 and engaging within one of a series of holes 42 in the member 14. A brake drum 44 may be provided on the inner surface of the member 12.

The tire and rim are illustrated in Figs. 1 and 2 as tightly secured onto the wheel. When it is desired to remove them from the wheel, the threaded bushing 46 is rotated sufficiently to withdraw the pin 40 from the hole 42 and the member 14 is then rotated, by means of the handle 38, in a direction to move the plungers 20 inwardly, the tire engaging sufficiently with the ground to prevent rotation of the member 12. This operation withdraws the shoes 30 and thus entirely frees the rim, which, with the tire, may be lifted therefrom. A substitute rim and tire can then be placed on the wheel and the shoes tightened thereonto merely by rotating the member 14 in the opposite direction. Thus the rim and tire can be removed and replaced merely by operating a latch and rotating a single element.

Another important feature of the invention resides in the fact that our improved wheel is adapted to receive rims varying considerably in size, thus providing one standard wheel for substantially all sizes of rims and tires. It will be understood that, as illustrated in Figs. 1 and 2, the shoes 30 have a considerable range of radial movement and the latch means 40—42 may be constructed and located to retain the shoes in any position of adjustment.

In Figs. 5–9 we have illustrated the form of our invention in which the rim is constructed in sections, which sections are carried by the spoke-forming elements of the wheel. This wheel comprises a hub portion, including an inner disk-like hub member, a cooperating outer hub member 14′, hub cap 34′ and spoke elements 20′ and 20″, all substantially as illustrated in Figs. 1 and 2. As illustrated, each of the two elements 20′ carries a substantially semi-circular rim section 48 and each of the two elements 20″ carries a shorter rim section 50 cooperating with the ends of the sections 48 and adapted to bridge the gap therebetween. The adjacent ends 49 of the sections 48 are preferably beveled in an inwardly-diverging direction, as illustrated, and each section 50 has an intermediate portion 52 adapted to engage therebetween and end portions 54 deflected radially inward and adapted to engage over and secure the ends 49. The sections 50 are also provided with edge flange portions 56 and 57 for engaging against and supporting the beads of the tire and the edges of the rim.

Figure 6:
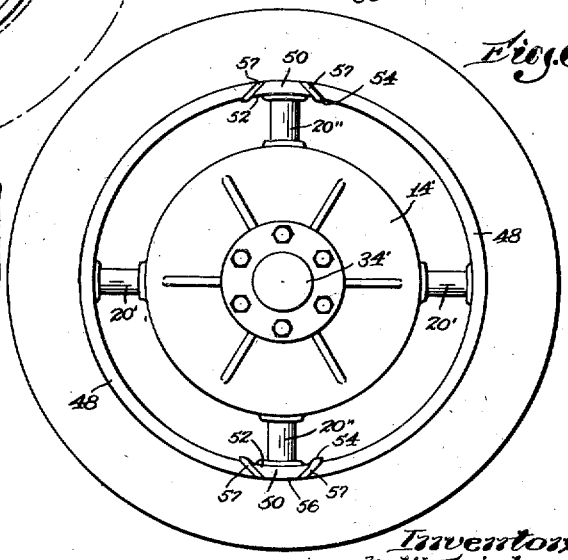
Fig. 6 is like Fig. 5 but shows the parts in the tire-holding position.
Figure 8:
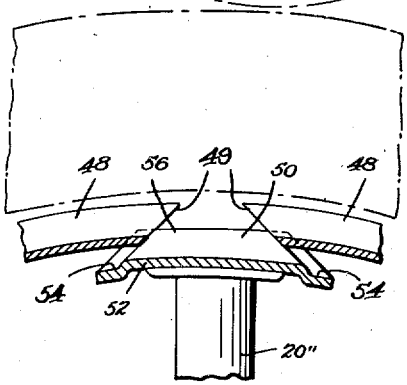
Fig. 8 shows the parts of Fig. 7 in another position.

When the spoke elements and the rim sections carried thereby are extended outwardly into tight engagement with the tire, the sections 48 are held in full contact with the tire and the sections 50 are wedged between the ends of the sections 48, as illustrated in Figs. 6 and 7, whereby to form a complete rim engaging and fully supporting the tire and its beads entirely therearound. When the tire is to be changed, the spoke elements and their rim sections are drawn inwardly to the position shown in Fig. 5 merely by rotating the member 14′, all as above described in connection with Figs. 1 and 2, it being understood that the tire is in deflated condition. The tire may now be freely removed from the wheel and another substituted therefor. Then, merely by rotating the member 14′ in the opposite direction, the rim sections may be brought to the full tire supporting position of Figs. 6 and 7.

It should be noted that the beveled construction of the ends 49 and the cooperating shape of the sections 50 permit the sections 50 to be wedged into position in a manner not only bridging the gap between such ends but also acting to spread the ends into firm contact with the tire and hold the ends as securely in alignment as though the rim were of one piece. It will also be understood that this beveled construction prevents any pinching of the sections 50 which would prevent their free withdrawal. The use of this improved wheel eliminates the necessity of independent rims for the tires and eliminates the difficult task of removing the tires from and replacing them on the rims, as required by the wheels heretofore known. It will, of course, be understood that the rim sections may be relatively proportioned as desired, the semi-circular construction of the sections 48 being herein illustrated as one preferred form thereof.

Figure 11:
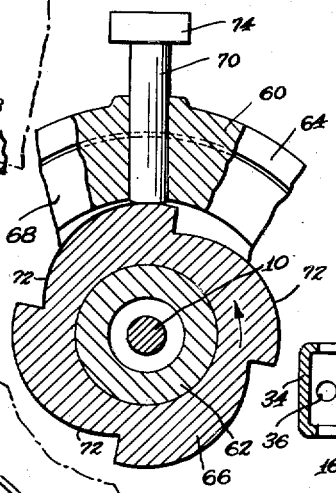
Fig. 11 is a sectional view taken on line 11—11 of Fig. 10.
Figure 10:
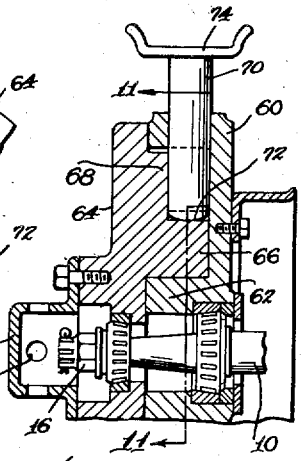
Fig. 10 is a fragmentary sectional view of a modified form of our invention.
Figure 5:
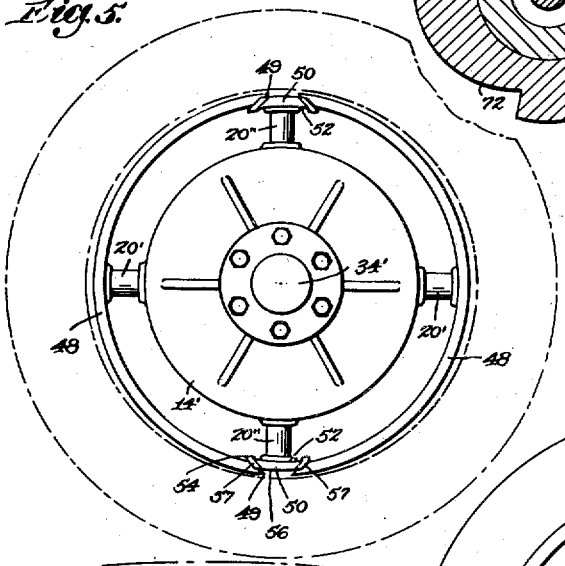
Fig. 5 is an elevation of a wheel embodying a modified form of the invention.
Figure 9:
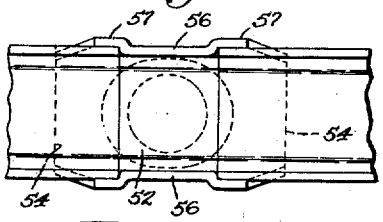
Fig. 9 is a plan view of the parts shown in Fig. 7.

In Figs. 10 and 11, we have shown a modified construction of our improved wheel, comprising an inner disk-like hub member 60 having a sleeve portion 62 on which is mounted a cooperating outer hub member 64. The member 60 is recessed to receive portions 66 and 68 of the member 62 thereinto and is provided with a plurality of radially-extending channels for receiving spoke elements 70. The inner face of the portion 68 may contact with and help to support the elements 70. The portion 66 is located in radial alignment with the spoke elements 70 and its periphery is formed into a plurality of inclined lands or cam surfaces 72, against which engage the inner ends of the spoke elements, the number of such surfaces 72 corresponding to the number of elements 70. It will be obvious that rotation of the member 64 in the direction of the arrow relative to the member 60 will cause radial outward movement of the elements and bring the shoes or rim sections 74 thereon into contact with the rim or tire. Any convenient means may be used to cause inward movement of the elements 70 when the member 64 is rotated in the releasing direction, if such means is found necessary or desirable. It will, of course, be understood that we have throughout the specification and claims used the terms "spiral", "cam surfaces" and "inclined lands" synonymously, with the intention that any eccentric surface which will cause movement of the spoke elements radially is within the scope of our invention.

Having thus described our invention, what we claim as new and desire to secure by Letters Patent is:

1. An expansible wheel for engaging and holding an annular member, comprising an inner member having a centrally disposed hub portion, said member extending radially outward from the hub portion and having a plurality of radially extending channels therein and extending through a flange integral with and projecting in an outboard direction from the peripheral portion of the member, a plurality of spoke-forming plungers respectively in said channels and extending outwardly through the flange, an outer member in face to face contact with the inner member and having a centrally disposed hub portion, said outer member extending radially outward and forming a cover for the inner member whereby the members house the plungers therebetween, the outer member being rotatable relative to the inner member and having a plurality of eccentric surfaces cooperating respectively with surfaces carried by the plungers whereby to move the plungers radially outward when the outer member is rotated in one direction relative to the inner member, and means for holding the members in said face to face contact, said inner and outer members respectively forming the inner and outer exposed portions of the wheel.

2. In an expansible wheel and an axle disposed centrally therethrough, an inner disk-like hub member having integral therewith a peripheral flange portion projecting in an outboard direction therefrom, an outer hub member, means on the axle including a nut acting against the outer member for holding the members in face to face relation, a plurality of radially-extending and spoke-forming plungers carried by the inner member and respectively slidable in radial channels extending through and radially inward of said flange portion, means providing a plurality of inclined surfaces connected to the outer hub member and respectively cooperating with the plungers whereby to move the plungers radially outward when the outer member is rotated in one direction relative to the inner member, and means carried on the outer ends of the plungers for engaging and holding an annular member extending therearound.

3. An expansible wheel for engaging and holding an annular member, comprising an inner disk-like member having a plurality of spoke-forming channels extending radially thereinto and open at their outer ends, said member having integral therewith a peripheral flange portion and a hub portion both projecting in an outboard direction therefrom and through which flange portion said channels extend, a plurality of radially-extending and spoke-forming plungers in the channels, the walls of the channels inwardly of said flange portion engaging and supporting the plungers for more than 180° therearound, an outer disk-like member in face to face contact with the flange portion of the inner member and having integral therewith a hub portion cooperating with the first-named hub portion whereby to house the plungers within the members and said hub and flange portions, means providing a plurality of inclined surfaces connected to the outer member and respectively cooperating with the plungers whereby to move the plungers radially outward when the outer member is rotated in one direction relative to the inner member, and means for holding the members in cooperating relation.

4. In an expansible wheel for engaging and holding an annular member, a rim comprising a plurality of sections of uniform thickness throughout and having the adjacent ends thereof beveled to diverge radially inward of the wheel, cooperating sections of like uniform thickness and each having an intermediate portion integrally connected to end portions thereof by inclined portions therebetween, said cooperating sections being adapted to engage between and bridge across the ends of the first-named sections in which position the inclined portions engage said beveled ends and said end portions overlap the ends of the first-named sections and hold them firmly therebeneath, a plurality of radially-extending spoke elements having their outer ends attached to said sections respectively, an inner hub member carrying said elements, and means including an outer hub member and a plurality of cam surfaces cooperating with the elements for simultaneously moving all of said elements radially outward when the outer member is rotated in one direction relative to the inner member.

5. In a wheel, a rim comprising a plurality of sections of uniform thickness throughout and having the adjacent ends thereof beveled to diverge radially inward of the wheel, cooperating sections of like uniform thickness and each having an intermediate portion integrally connected to end portions thereof by inclined portions therebetween, said cooperating sections being adapted to engage between and bridge across the ends of the first-named sections in which position the inclined portions engage said beveled ends and said end portions overlap the ends of the first-named sections and hold them firmly therebeneath, edge flanges on each cooperating section comprising oppositely disposed intermediate portions for engaging the beads of a tire and oppositely disposed and more widely spaced end portions for overlapping the edges of the first-named sections, a plurality of radially-extending spoke elements having their outer ends attached to said sections respectively, an inner hub member carrying said elements, and means including an outer hub member and a plurality of cam surfaces cooperating with the elements for simultaneously moving all of said elements radially outward when the outer member is rotated in one direction relative to the inner member.

6. In an expansible wheel for engaging and holding an annular member, a rim comprising a plurality of cooperating sections including oppositely-disposed, relatively long sections and oppositely-disposed and relatively shorter sections for engaging between the ends of the relatively long sections, the said shorter sections having beveled end portions adapted to be wedged between the ends of the longer sections and having extended end portions for overlapping the ends of the longer sections, a plurality of radially-extending spoke elements having their outer ends attached to said sections respectively, an inner hub member carrying said elements, and means including an outer hub member and a plurality of cam surfaces cooperating with the elements for simultaneously moving all of said elements radially outward when the outer member is rotated in one direction relative to the inner member.

7. The combination defined in claim 6, comprising two oppositely-disposed and substantially semi-circular longer sections and two oppositely-disposed and shorter sections cooperating therewith and engageable between the ends thereof.

8. In a wheel, a rim comprising a plurality of cooperating sections including oppositely-disposed, relatively long sections and oppositely-disposed and relatively shorter sections for engaging between the ends of the relatively long sections, the said shorter sections having beveled end portions adapted to be wedged between the ends of the longer sections and having extended end portions for overlapping the ends of the longer sections and said shorter sections having oppositely disposed edge flanges spaced to overlap the beads of a tire and the edges of the relatively long sections, a plurality of radially-extending spoke elements having their outer ends attached to said sections respectively, an inner hub member carrying said elements, and means including an outer hub member and a plurality of cam surfaces cooperating with the elements for simultaneously moving all of said elements radially outward when the outer member is rotated in one direction relative to the inner member.

9. An expansible wheel for engaging and holding an annular member, comprising an inner hub member having a portion thereof extending radially outward and an annular portion extending axially outward, an outer hub member having an annular portion extending axially inward and fitting over the second-named portion, a plurality of radially-extending plungers carried by the inner member and respectively slidable in radial channels in the first-named portion, eccentric surfaces formed on the periphery of the third-named portion and engaging the inner ends of the plungers whereby rotation of the outer member in one direction relative to the inner member is adapted to move the plungers outwardly, and means carried on the outer ends of the plungers for engaging said annular member.

10. An expansible wheel for engaging and holding an annular member, comprising an axially inner member having a hub portion and a radially outer plunger-holding portion, an axially outer member cooperating therewith, and having a hub portion in telescopic relation and axial alignment with the first-named hub portion, a plurality of radially-extending plungers carried by the said outer portion of the inner member and respectively slidable in radial channels therein, eccentric surfaces formed on the outer member and located between and engaging the inner ends of the plungers whereby rotation of the outer member in one direction relative to the inner member is adapted to move the plungers outwardly, and means carried on the outer ends of the plungers for engaging said annular member.

LESTER S. FEINBERG.
MARCUS W. FEINBERG.